United States Patent
Caulkins et al.

(10) Patent No.: US 7,424,587 B2
(45) Date of Patent: Sep. 9, 2008

(54) METHODS FOR MANAGING DATA WRITES AND READS TO A HYBRID SOLID-STATE DISK DRIVE

(75) Inventors: Jason Caulkins, Redding, CA (US); Michael Richard Beyer, Redding, CA (US)

(73) Assignee: Dataram, Inc., West Windsor, NJ (US)

( * ) Notice: Subject to any disclaimer, the term of this patent is extended or adjusted under 35 U.S.C. 154(b) by 227 days.

(21) Appl. No.: 11/439,615

(22) Filed: May 23, 2006

(65) Prior Publication Data

US 2007/0276994 A1    Nov. 29, 2007

(51) Int. Cl.
*G06F 12/00* (2006.01)
*G06F 12/16* (2006.01)

(52) U.S. Cl. ............... 711/165; 711/3; 711/4; 711/103; 711/113; 711/162

(58) Field of Classification Search ......... 711/102, 711/103, 105, 111, 154, 165, 3, 4, 5, 113
See application file for complete search history.

(56) References Cited

U.S. PATENT DOCUMENTS 5,535,399 A * 7/1996 Blitz et al. ............. 714/6
2005/0185496 A1* 8/2005 Kaler ............... 365/230.06

FOREIGN PATENT DOCUMENTS

JP    20013188832 A    * 11/2001

* cited by examiner

*Primary Examiner*—Jack A Lane
(74) *Attorney, Agent, or Firm*—Central Coast Patent Agency, Inc.

(57) ABSTRACT

A method for writing data to a solid-state disk having a first portion of solid-state memory of a volatile nature and a second portion of solid-state memory of a non-volatile nature, and a controller for controlling data operations to the memory includes acts of (a) receiving at the controller, write data for writing to an assigned address in non-volatile memory; (b) determining at the controller if there is existing data associated with a write address in volatile memory, the write address referencing the assigned address in volatile memory; and (c) upon finding data in volatile memory held for the assigned write address or not at act (b), writing the data into the volatile memory at a predestinated write address in volatile memory.

8 Claims, 10 Drawing Sheets

METHODS FOR MANAGING DATA WRITES AND READS TO A HYBRID SOLID-STATE DISK DRIVE

CROSS-REFERENCE TO RELATED APPLICATIONS

NA

BACKGROUND OF THE INVENTION

1. Field of the Invention

The present invention is in the field of computer data storage devices and pertains particularly to a system including methods and apparatus for high-speed data storage and access from a computing device.

2. Discussion of the State of the Art

In the field of data storage, non-volatile mechanical disk drives have long been relied upon for non-volatile short and long-term data storage. More recently, solid-state non-volatile memory has been implemented for data storage needs, especially in small portable electronic computing devices such as cellular telephones, video cameras and the like. Volatile memory is a solid-state memory typically only used as a high-speed temporary memory such as random access memory (RAM) of which there are many variations known. Common versions of RAM include Dynamic Random Access Memory (DRAM) and Static Random Access Memory (SRAM). Flash memory is a solid-state high-speed data storage solution used primarily in handheld devices or Universal Serial Bus (USB) peripheral devices. Flash memory provides a non-volatile memory for storing data with update speeds approaching that of RAM read and writes access. However, erasing and rewriting to flash memory is comparatively much slower than RAM as entire flash blocks or cells must be erased at one time.

Flash memory has practical uses in cell phones, video cameras, plug-in cards and USB memory devices for portable laptop computers and the like. Disadvantages of using flash as permanent storage in robust systems include the fact that a number of writes performed on the memory defines the life or Mean Time before Failure (MTBF) of a flash memory chip. Another disadvantage is that access to data, while random for reads and writes is still slower than RAM.

It has occurred to the inventor that there is a need for faster data management speeds in the computing industry in general and in particular in the area of robust servers and other business machines. Further, it is desired to provide a pure solid-state disk drive that may be implemented as a normal hard drive package that is recognized and read by a host system as a single non-volatile storage disk, which is swappable with existing mechanical hard disk drives used in many computing systems including desktop computers, data servers, and in mass storage systems using multiple disks stacked in custom or standard array. A system and method for implementing the same would provide much greater data storage and access speeds for computing systems in general.

SUMMARY OF THE INVENTION

A method is provided for writing data to a solid-state disk having a first portion of solid-state memory of a volatile nature and a second portion of solid-state memory of a non-volatile nature, and a controller for controlling data operations to the memory. The method includes the acts, (a) receiving at the controller, write data for writing to an assigned address in the non-volatile memory, (b) determining at the controller if there is existing data associated with a write address in the volatile memory, the write address referencing the assigned address in the volatile memory, and (c) upon finding data in the volatile memory held for the assigned write address or not at act (b), writing the data into the volatile memory at a predestinated write address in the volatile memory.

In one aspect, in act (a), the write address is a logical block address (LBA) tabled in a Flash LBA table held in a reserved portion of the volatile memory and the non-volatile memory is one of a NAND Flash memory or another type of non-volatile storage. In this aspect, in act (b), the determination is made by looking for a reference to a LBA in volatile memory in the Flash LBA table at the assigned LBA entry in the table. In a variation of this aspect, in act (c), the predestinated LBA is determined by a pointer pointing to the predestinated LBA of data in a RAM LBA table held in a reserved portion of the volatile memory and the volatile memory is RAM or a variation thereof. In another variation of the aspect, in act (c), if previous data was found in memory for the assigned Flash LBA, then the RAM LBA entry in the Ram LBA table associated to the previous data written is updated to invalidate the previous data. In a preferred aspect, in act (c), the data written is held in the volatile memory until one or more trigger events cause the data to be moved into the non-volatile memory.

According to another aspect of the invention, a method is provided for isolating a portion of memory from excessive writes on a solid-state disk having a first portion of solid-state memory of a volatile nature and a second portion of solid-state memory of a non-volatile nature, and a controller for controlling data operations to the memory. The method includes the acts, (a) writing data to the volatile memory of the disk and referencing an address in non-volatile memory to the address of the data in the volatile memory, (b) filling a portion of the volatile memory by repeating act (a) until a predetermined full threshold value of data in the volatile memory is exceeded, (c) upon exceeding the threshold value of act (b), locating the oldest data written in the volatile memory and determining the validity state of that data, and (d) writing the oldest data into the non-volatile memory only if the conditions exist that the data is valid and that no other useable address in the volatile memory can be found to accept the valid data.

In a variation of this aspect, in act (a), the volatile memory is RAM or a variation thereof and the non-volatile memory is a type of Flash or other non-volatile storage. Also in this aspect, in act (a), the addressing is based on LBAs maintained in tables, one representing RAM and one representing Flash. In another variation of this aspect, in act (c), pointers are used in the table representing RAM space to determine when the threshold value has been exceeded, the determination based on a predetermined value compared to the difference in LBA entry positions referenced by the pointers in the table. In one aspect, the method further includes an act (e) for repeating act (d) according to the conditions until a predetermined minimum threshold value of data in volatile memory is realized.

According to still another aspect of the invention, a method is provided for balancing writes over more than one non-volatile memory unit on a solid-state disk having a first portion of solid-state memory of a volatile nature and a second portion of solid-state memory of a non-volatile nature, and a controller for controlling data operations to the memory. The method includes the acts (a) performing a write operation to an active unit of the non-volatile memory portion of the disk, (b) advancing a counter by one increment as a result of act (a), (c) repeating acts (a) and (b) in sequence until a predetermined total number of write operations have been performed to the non-volatile memory, (d) upon reaching the predetermined value in act (c), activating a previously assigned spare unit of non-volatile memory for access at a new location in the linear space of non-volatile memory and designating an active unit as the spare unit, (e) resetting the counter to 0 writes and (f) repeating acts (a) through (e) in continuing rotation.

In one aspect, in act (a) the write operation is limited to one LBA or a block of LBAs of data written and in act (b) the counter is incremented for each LBA of data written. Also in one aspect, in act (c) the write counter value is compared to a value programmed into the controller memory.

According to still another aspect of the invention, a method is provided for protecting data in volatile memory on a solid-state disk having a first portion of solid-state memory of a volatile nature and a second portion of solid-state memory of a non-volatile nature, and a controller for controlling data operations to the memory. The method includes the acts (a) providing a power subsystem integrated with the disk, the subsystem including a sensor for sensing power from the host, a battery for powering the disk independently from the host, and a switch for switching to battery power in the event of loss of power from the host, (b) sensing loss of power from the host, (c) switching over to battery power as a result of act (b), and (d) notifying the controller to move valid data from the volatile memory on the disk into the non-volatile memory on the disk.

In a variation of this aspect, in act (a), the host is one of a computing system requiring non-volatile data storage. In another variation, in act (d), moving data from volatile to non-volatile memory is a default instruction resulting from loss of power due to inadvertent power interruption and due to planned system shut down.

In one aspect, the method includes an act (g) for incrementing another counter stored in a portion of non-volatile memory reserved on the controller, the counter tracking the number of unit rotations which have taken place during the life of the device, the act carried out once for every act (e) carried out.

In still another aspect of the invention, a method is provided for reading data from a solid-state disk having a first portion of solid-state memory of a volatile nature and a second portion of solid-state memory of a non-volatile nature, and a controller for controlling data operations to the memory. The method includes the acts (a) accessing a table held in the volatile memory to look up a read address marking the beginning of a requested read operation, (b) determining if data exists in the non-volatile memory or in the volatile memory for the requested read address, (c) upon confirming a memory location representing or associated to the target address, accessing the memory currently holding the data and reading the data; and (d) repeating acts (a) through (c) for each address for which a read operation is requested.

BRIEF DESCRIPTION OF THE DRAWING FIGURES

DETAILED DESCRIPTION

Figure 1:
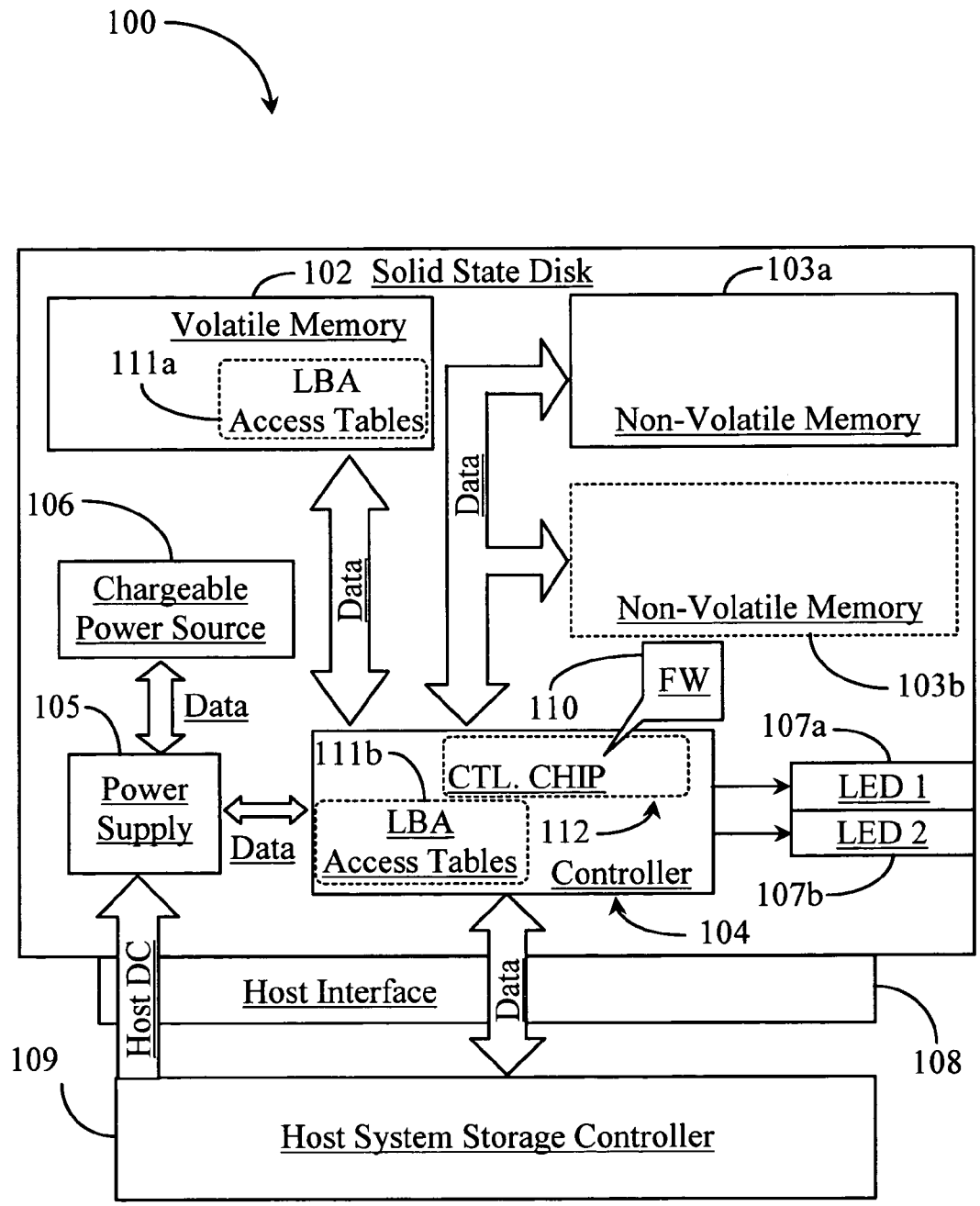
FIG. 1 is a block diagram of a high-speed solid-state non-volatile disk according to an embodiment of the present invention.

FIG. 1 is a block diagram of a hybrid solid-state storage device 100 according to an embodiment of the present invention. Device 100 is adapted as a solid-state storage disk drive that may be recognized by any standard operating system as a standard data storage disk. Device 100 includes a host interface 108, which may be a Small Computer System Interface (SCSI) or one of many known variations thereof. Known variations include SCSI 1, 2, and 3, Wide SCSI, Fast SCSI, Ultra SCSI, Fast Wide SCSI, Ultra Wide SCSI, and so on. It may be assumed in this embodiment and throughout this specification that disk 100 is adapted for SCSI input/output from the host system exemplary of one embodiment. However this should not be construed as a limitation as disk 100, with slight modifications, may readily be adapted to be recognized using a Integrated Drive Electronics/Advanced Technology Attachment (IDE/ATA) interface, an Enhanced Small Device Interface (ESDI), a Serial Advanced Technology Attachment, (SATA), or a Parallel Advanced Technology Attachment (PATA) interface. Disk 100 may also be adapted to work with enterprise Fibre Channel data storage networks and serial attached SCSI (SAS) networks. In this particular embodiment, disk 100 may be thought of as a SCSI "hot swappable" drive using the appropriate form factor and interfaces. With the addition of an onboard disk controller functionality (described below) the system may be adapted to an expansion bus embodiment.

In one embodiment, disk 100 is packaged according to standard dimensions for disk drives conforming substantially to a 4 inch by 1 inch by 5 and ¾ inch form factor or other standard form factors. Disk 100, in this exemplary embodiment, reports to a host system storage controller illustrated herein as host system storage controller 108 as a SCSI low voltage differential (LVD) U320 disk. In this exemplary embodiment, interface 108 is a standard SCSI SCA 80-pin connector, however one with skill in the art will recognize that other connectors might be used depending on SCSI version.

Disk 100 includes a volatile memory 102. Memory 102 may, in one embodiment, be a version of RAM known as synchronous dynamic RAM or SDRAM. In this embodiment SDRAM 102 may include an enhancement known as double data rate (DDR) which transfers data both on the rising and falling edge of the computer processing unit (CPU) clock unit. Other types of RAM are known in the art and are available to the inventor and might be provided to disk 100 without departing from the spirit and scope of the present invention.

Volatile memory 102 may hold up to 8 gigabytes (GB) or more of data including an extra GB reserved for error correcting code (ECC) data. One with skill in the art will recognize that volatile memory 102 may be more than or less than 8 GB without departing from the spirit and scope of the present invention.

Disk 100 includes at least one non-volatile memory 103a and may include additional non-volatile memories such as a non-volatile memory 103b illustrated herein as an alternate memory block, which may be accessed in place of, or in addition to block 103a. In one embodiment, memory 103a is Flash memory. In this embodiment, memory 103b is also Flash memory. Flash memory blocks 103a and 103b may be one of or a combination of NOR Flash or NAND Flash without departing from the spirit and scope of the present invention. In one preferred embodiment, NAND Flash is used because of a higher density of data storage capacity. However, the use of NAND or NOR Flash should not be construed as a limitation as future implementations of non-volatile memory may also be contemplated and applied without departing from the spirit and scope of the present invention. One example is Magnetoresistive Random Access Memory (MRAM), which is currently being developed. Another example is Ferroelectric Random Access Memory (FRAM). Still another example of non-volatile RAM (NVRAM) is Nano Random Access Memory (NRAM).

In one embodiment, non-volatile memory 103a is provided as a plug-in memory card, sometimes referred to in this specification as a daughter card. As such, memory 103b may be thought of as an optional daughter card. There may be more than two non-volatile memories plugged into disk 100 without departing from the spirit and scope of the present invention. For purpose of discussion only, the inventor provides up to 3 Flash cards or daughter cards that may be shipped with disk 100, each card written to in isolation from the other cards according to a unique "write balancing" technique that will be described later in this specification. In a preferred implementation a minimum of 8 GB of non-volatile memory is provided, but up to 128 GB of non-volatile memory may be conveniently provided on a single disk 100 within the standard form factor boundaries.

Disk 100 has an onboard power supply or subsystem 105 provided thereto and adapted in one embodiment, to receive direct current (DC) power from the host system. This is illustrated herein by a logical arrow labeled "Host DC" from controller 109 to power supply 105. Disk 100 also includes an onboard chargeable power source 106. Power source 106 may be a rechargeable cell or battery or a bank of those arrayed and adapted to provide backup power to disk 100 in the event that power from a connected host system is interrupted. Power supply 105 has connection to power source 106 via at least a signal port if not a logical bus structure labeled herein, data. Power source 106 automatically detects whenever there is an interruption or lack of power coming in from the host and thereafter provides the power needed to protect against loss of RAM data and to provide component power for ongoing tasks being performed on the disk at the time of primary power loss, including the task of moving data from RAM into Flash. It is important to note herein that disk 100 may be provided as a hot swappable storage disk.

Disk 100 has an onboard controller 104 provided thereto and adapted to perform all of the onboard tasks related to data management and protection of data written to disk 100 by one or more host systems. It is noted herein that disk 100 may be adapted in one embodiment as a shared data storage disk drive. Controller 104, among other tasks, is adapted primarily to manage data writes and reads incoming from a host to both volatile memory 102 and to non-volatile memory 103a. Controller 104 is provided in an electronics board form factor that includes an onboard controller chip (CTL. Chip) 112. CTL chip 112 may be a field programmable gate array (FPGA) or it may be an application specific integrated circuit (ASIC). In this embodiment, an FPGA is the preferred implementation because of its programmable nature.

Controller 104 has logical data bus connection to memory blocks 102 and 103a and 103b in this example and logical bus communication (SCSI) through interface 108 to a host system controller 109 of a host system. The bus structures are logically illustrated herein as block arrows labeled "Data". In this exemplary implementation, CTL chip 112 is a FPGA and has firmware (FW) 110 provided thereto and adapted as "controller intelligence" for managing RAM cache and for determining which memory type to read and write from. FW 110 is a compilation of instruction sets that cause the machine (controller) to perform tasks of writing to RAM, reading from RAM, moving data from RAM to flash, writing directly to flash, and reading from flash. FW 112 also contains special instructions for managing RAM cache according to certain pre-specified conditions, which may exist at any given point in time during the operation of disk 100.

Disk 100 has one or more visual indicators illustrated herein as 107a and 107b that are connected to CTL chip 112 via signal lines and that are visible from the outside of disk 100. In one embodiment, visual indicators 107a and 107b are light emitting diodes (LEDs). LED 107a may indicate on/off status of disk 100. LED 107b may indicate read/write status of controller 104.

Controller 104 makes use of one or more tables to facilitate management of data and data tasks with regard to data being stored in and written to or read from volatile and non-volatile memories 102 and 103a respectively. In this regard, some portion of volatile memory 102 may be reserved within block 102 to contain one or more software tables. In one embodiment, Local Block Address (LBA) access tables 111a are provided to reside in a reserved portion of volatile memory 102. Tables 111a may include one table for containing LBAs used for writing data to or reading data from volatile memory 102 and one table for containing LBAs used for writing data to and reading data from non-volatile memory 103a and/or any other connected cards such as 103b.

In another embodiment, the LBA table or tables may be provided as local tables 111b accessible to CTL chip 112 onboard controller 104 using one or more additional RAM chips mounted to the controller board and bussed to CTL chip 112. In still another embodiment, a predetermined amount of non-volatile memory may also be reserved for storing a flash LBA table. In this case, reserved non-volatile flash may be provided locally to controller 104 or reserved on each useable flash daughter card installed in disk 100.

Controller 104 has a unique relationship with volatile memory 102 and non-volatile memories 103a and 103b in that it attempts to utilize volatile memory 102 as much as is possible for data writing and data reading while isolating non-volatile memory from data writes as much as is possible. Controller 104 accomplishes memory management and access using LBA access tables and updates those tables with the most current data storage sates recorded. More detail regarding LBA tables and the purposes of those tables will be provided later in this specification.

In general, controller 109 views disk 100 has a single SCSI non-volatile disk drive. Write and read requests coming in from host controller 109 are carried out by onboard controller 104 according to unique data management methods that consider available volatile and non-volatile memory on disk 100 as a hybrid of RAM and Flash for smart data caching and data access from cache or Flash and for permanent data storage to non-volatile memory at appropriate but, optimally, infrequent times.

Non-volatile memory blocks 103a and 103b (alternate block) are provided in one embodiment, in the form of multiple high-density Flash chips strategically mounted to a plug-in daughter card and connected in parallel for data communication with controller 104. In one embodiment, there is a 256-bit data path created for Flash communication, however 128-bit or 64-bit data paths may be used in some embodiments. Volatile memory, in one example, SDRAM DDR-2 is, in a preferred embodiment, provided up to a storage capacity that rivals the non-volatile data storage capacity of the drive. A unique write-balancing technique is provided for reducing wear to flash memory caused by writing to flash. Write balancing involves designating at least one flash unit as a spare unit then rotating that unit into service after a number of writes to flash have occurred and designating a next spare unit for the next rotation. More detail on flash write balancing will be provided later in this specification.

A host reading and writing to disk 100 sees LBAs as LBAs of memory in a single (non-volatile) memory disk. However, controller 104 distinguishes between RAM (volatile) LBAs and corresponding Flash (non-volatile) LBAs when writing and reading data on behalf of the host system. Tables 111a or 111b local to controller 104 may include a Flash table and a RAM table viewable only by the local controller (104). Each LBA representing a unit of volatile memory corresponds to and is cross-referenceable in at least one table to a LBA representing a like unit of non-volatile memory.

The LBA access table for volatile memory incorporates a sliding start point and end point that together define a valid range of useable volatile memory. When data is moved from volatile to non-volatile memory, the start point for that moved data referencing an LBA where the data is stored is incremented up in the table to the next LBA in the table. Likewise, the end point is incremented to a next LBA entry every time data is written to volatile memory. The use of both volatile and non-volatile storage in the hybrid solid-state storage disk of the present invention is mitigated by controller 104 such that data writes to the non-volatile memory are minimized as much as is possible, the bulk of which occur only at power down of the host system at which time all valid data stored in volatile memory is moved into non-volatile memory. Additionally, rotating between designated blocks of non-volatile memory based on total writes to that memory further enhances the MTBF of the non-volatile memory portion of the disk. More about management of volatile and non-volatile memory of disk 100 is discussed in enabling detail further below.

Figure 2:
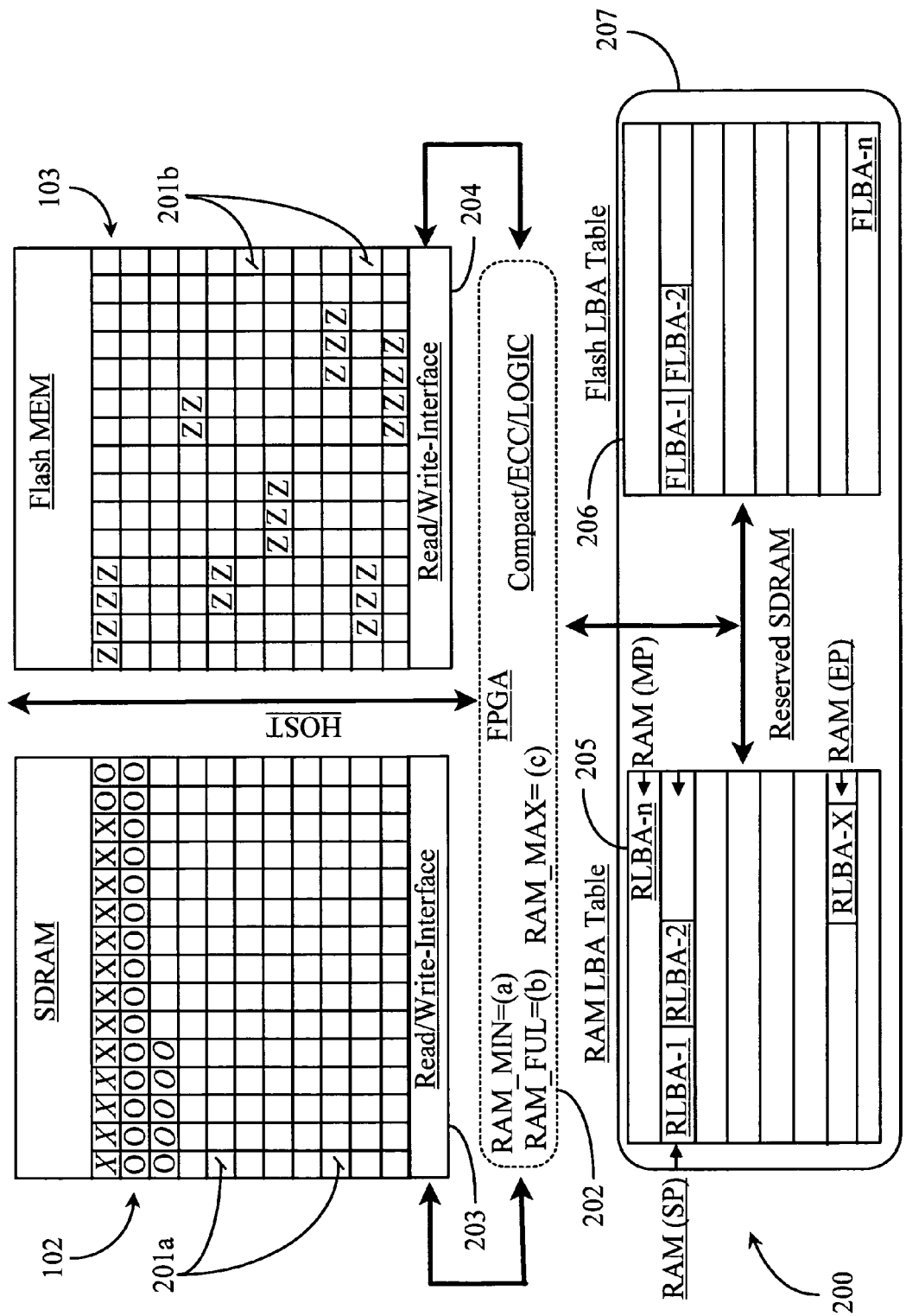
FIG. 2 is a block diagram illustrating use of volatile and non-volatile memory in combination for storing and accessing data on a disk analogous to the disk of FIG. 1 according to an embodiment of the present invention.

FIG. 2 is a block diagram 200 illustrating use of volatile memory and non-volatile memory in combination as a single hybrid non-volatile memory for storing and accessing data on a disk analogous to the disk of FIG. 1 according to an embodiment of the present invention. Diagram 200 is logically represented herein and should be considered exemplary of one possible embodiment for managing two or more memories of mixed type as a single non-volatile memory space.

For the purpose of illustration memory 102, which in this example, is SDRAM is logically divided into units of memory 201a. In one embodiment, units 201a each hold 512 bytes of data although any suitable unit of measure may be used. Each cluster 201a is represented in a RAM table illustrated herein as a RAM table 205 stored in a reserved portion of SDRAM 207. As discussed above, the reserved portion of RAM may be partitioned from SDRAM 102 or it may be separate RAM chips mounted to the controller board and accessible to the controller chip.

Non-volatile memory 103, in this case, Flash memory, is also logically divided into memory units 201b. Units 201b may be 512 bytes large or of some other block size than units 201a without departing from the spirit and scope of the present invention. Each unit 201b in Flash memory may be represented by a LBA that is stored in a Flash table illustrated herein as Flash table 206 stored, in this case, in reserved SDRAM 207. It is noted herein that in one embodiment, Flash table 206 may instead be stored in a reserved portion of Flash memory without departing from the spirit and scope of the present invention. In the latter case, a reserved portion of Flash memory may be partitioned from active Flash blocks, or may be provided as a set of Flash chips mounted onboard controller 104 described further above.

Controller 104 described further above is logically represented in this example by FPGA 202, which includes FW 110 described above with respect to FIG. 1. In this case FPGA 202 and loaded FW provides all of the controller function. FPGA 202 has a data channel (HOST) to a host controller of a host system. FPGA 202 also has a data channel to reserved SDRAM 207. FPGA 202 has a data channel to Flash memory 103 through a read/write interface 204 and a data channel to SDRAM 102 through a read/write interface 203. One with skill in the art will understand that the functions described above may be distributed over more than one chip or to a combination of chips and or microcontrollers without departing from the spirit and scope of the present invention.

Firmware loaded onto FPGA 202 includes an ECC utility, logic for managing data stored on the hybrid solid state disk, and a cache compacting algorithm for further optimizing isolation of Flash memory 103 from writes during normal operation. FPGA 202 contains at least three programmable values that are predetermined and are used in conjunction with management of RAM LBA table 205. These values are a RAM minimum (RAM_MIN) value (a); a (RAM_FULL) value (b); and a RAM maximum (RAM$_{13}$ MAX) value (c) (optional). The just described values are used by FW loaded on FPGA 202 to manage the current capacity of SDRAM 102 during operation.

RAM LBA table 205 lists all of the logical LBAs representing units 201a in SDRAM 102. Each LBA appears sequentially from LBA-1 to LBA-N. FPGA 202 utilizes at least three LBA pointers when consulting RAM LBA table 205 for determining at least one SDRAM memory range logically in the table that will hold valid data and at least one buffer zone where data should not be written except as a last resort. For example, table 205 has a RAM start pointer (RAM SP) and a RAM end pointer (RAM EP). RAM (SP) points to the current beginning LBA of a defined range of LBAs, the current end of which is pointed to by the RAM (EP). It is important to note herein that this range is flexible in that it never equals the total SDRAM memory space in units and that it expands accordingly with writes of new data into SDRAM and retracts accordingly when data is compacted or if it is moved to Flash memory.

The exact range of LBAs in SDRAM cache at any given point in time during runtime is expressed as the value of RAM (EP)-RAM (SP) taken against a reference point such as LBA-0 for example. Another pointer may be provided as an option within FPGA 202 as described above. A RAM maximum pointer RAM (MP) may be provided in one embodiment to point to a LBA that is one LBA behind the RAM (SP) at any given point in time to determine a buffer zone. Therefore, a buffer zone in RAM may be defined as RAM SP-1. The RAM (MP) may be one LBA behind the RAM (SP) and is incremented each time the RAM (SP) is incremented in the table. In this example, RAM (MP) points to LBA-n. It is noted herein that each RLBA-1 through n corresponds to a Flash LBA (FLBA), the aggregation illustrated herein as FLBA-1 through FLBA-n in Flash table 206.

Therefore, each time FPGA 202 consults before writing or reading data, it first accesses Flash LBA table 206 to determine state of that particular LBA. The state determined is whether there is data for that address in RAM or not. All data writes to the disk are first written to SDRAM 102 at a LBA in RAM evidenced by the current position of the RAM (EP) at the time of write. More detail about data management through manipulation of tables 205 and 206 is provided later in this specification.

SDRAM 102 is illustrated in this example to have data stored therein in memory units 201a. Valid data in SDRAM 102 or data that cannot be overwritten is represented by Os and older data or data that may be overwritten or aged out of validity in represented by Xs. In actual practice, the data is sequentially written into SDRAM 102. Data from SDRAM 102 that has been moved to Flash MEM 103 is represented by Zs and is illustrated already moved to Flash MEM 103 in random units or Flash cells 201b. It is important to note herein that the data unit size in Flash may be different than the data unit size in RAM. However, they both are based on bytes. Controller 202 handles addressing of both RAM and Flash space transparently from the host system. The host system sees only one standard LBA address for a write or read operation.

In general use, all data is written to SDRAM beginning at whatever RLBA is currently pointed to by the RAM (EP). The RAM (EP) is incremented to a next LBA at each new write. As data ages in cache, the oldest data may be optionally moved to Flash MEM if it is not overwritten by new data in cache. The RAM (SP) points to the oldest data in cache. If that data is moved to Flash 103, then the RAM (SP) is incremented to the next LBA. If the data referenced by an LBA is overwritten at a later time somewhere else in RAM the older data is said to have aged to invalidity. It is noted herein that the pointer RAM (MP) is optional and is not specifically required in order to practice the present invention. Instead, a predetermined RAM maximum value may be stored on the controller chip and can be compared with (EP)-(SP) to determine if the RAM is maxed out and cannot accept more data.

In one embodiment, if the oldest data in cache is not overwritten and there is an LBA available to write to somewhere within the valid range between the RAM (SP) and the RAM (EP), that data may optionally be moved to a new LBA in cache instead of being moved to Flash, using a compacting routine which maintains the age relationship of the data. In this way, SDRAM 102 is compacted to further isolate Flash MEM 103 from any data writes. At shutdown of the host system, all of the valid data in SDRAM 102 is moved into Flash MEM 103 for non-volatile permanent storage by default. At boot, RLBA table 205 is initialized to all Os indicating no data currently in SDRAM. All of the previous data has been moved into Flash 103 at the appropriate corresponding FLBAs.

For each LBA of memory of one type, there is an entry for a corresponding LBA of the other type. Therefore, when data is moved from SDRAM to Flash, for example, the table is updated to reflect that the RLBA may be written to again. Specific bits are reserved from the 32-bit LBA entry to reflect the corresponding LBA and to indicate where the data is, for example, in RAM or not for any LBA accessed.

In this example, the first 4 Xs in memory 102 are italicized for discussion purposes indicating that data although old, is valid and can be moved somewhere else in RAM without writing to flash using LBAs in RAM that can accept the data. The last 4 Os in RAM are italicized for discussion purposes to indicate that those units were available within the valid range to accept the moved data. This optimization is termed compacting the cache by the inventor and will be discussed in more detail later in this specification. Compacting provides a further tool for isolating Flash memory from data writes. In the case of compacting, the RAM SP is incremented up for each LBA of data moved elsewhere in cache.

Figure 3:
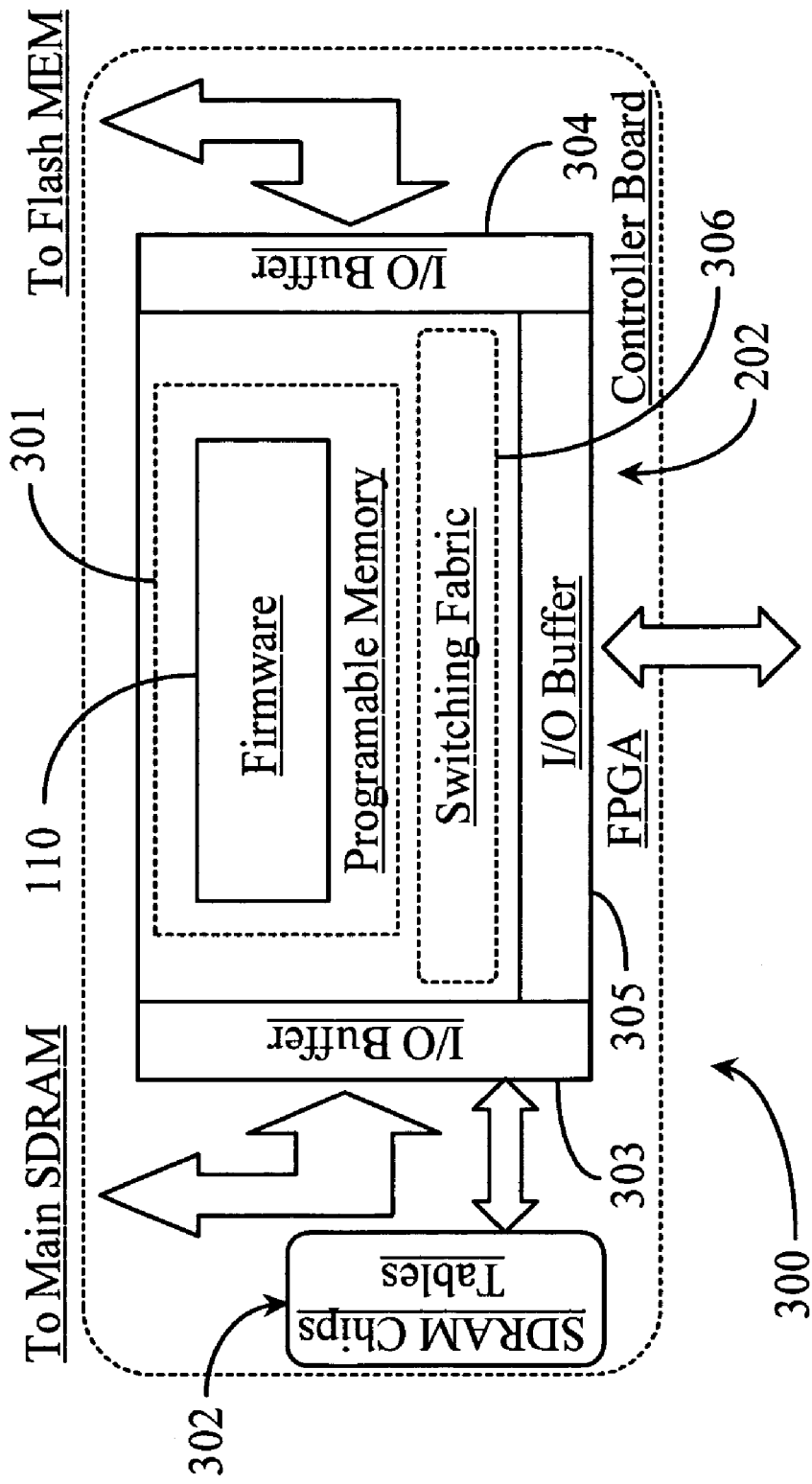
FIG. 3 is a block diagram illustrating a disk controller for managing disk function according to an embodiment of the present invention.

FIG. 3 is a block diagram illustrating a disk controller 300 for managing disk function according to an embodiment of the present invention. Controller 300 is analogous to disk controller 104 described above with reference to FIG. 1. Controller board 300 includes all of the necessary components making up an onboard controller for managing hybrid memory consisting of SDRAM and Flash memory. Controller 300 includes, in this embodiment, FPGA 202. Also in this example, controller 300 includes reserved SDRAM chips 302 holding local LBA tables.

Controller 300 is the solid-state hybrid disk drive motherboard and controls all read and write functions as well as all erase functions. FPGA 202 has at least one I/O data buffer utility 303 for temporarily storing data going into and coming out of the controller. The block arrow illustrates bi-directional communication with main SDRAM. Buffer 303 also has a bi-directional data path to reserved SDRAM 302 as illustrated by a second block arrow.

FPGA has at least another I/O data buffer utility 305 for temporarily storing data going into and coming out of the controller. A block arrow illustrates bi-directional communication with a host system or host controller. FPGA 202 has at least one I/O data buffer utility 304 for temporarily storing data going into and coming out of the controller. A block arrow illustrates bi-directional communication with Flash. Although in this illustration, each I/O buffer utility is illustrated in communication with a separate external entity, this is logical only. In actual practice a pool of I/O buffers is provided on the controller for buffering all data coming into and going out of the controller. Switching fabric 306 provides path assignment and switching for the asynchronous movement and buffering of data irregardless of ultimate destination of that data. Therefore, buffers 303, 304, and 305 may be thought of as one I/O buffer. They are illustrated separately for logical illustration only.

FPGA 302 has sufficient programmable memory 301 for storing Firmware 110, which includes all of the instruction sets, values and pointers for operating the solid state hybrid disk of the present invention successfully. Firmware 110 may be provided in whole or in parts at the time of packaging of the solid-state hybrid disk of the present invention. Additional machine-readable instruction sets may be "Flashed" in to the programmable memory 301 of FPGA 202. Memory 301 may be an EEPROM Flash type memory that is non-volatile and may be erased and reprogrammed from a remote or from a host station without departing from the spirit and scope of the present invention.

In general practice of the present invention, data coming in from the host for write enters I/O buffer utility 305 and waits for FW 110 to determine how the data will be handled. In this example, FPGA 202 consults a Flash table reserved in SDRAM 302 to see if any data is in RAM for the LBA looked up for write. In either case, FPGA 202 instructs that the data waiting in buffer 305 be written to SDRAM at the next available RLBA evidenced by the RAM (EP) described further above. The write data then is moved from the host buffer and is written to RAM. It is noted herein that in this asynchronous mode, the write may happen before the Flash table is consulted because the write is going to RAM cache. FPGA 202 updates the RAM and Flash tables and increments the RAM (EP) to the next RLBA. Data from the host is never written directly to Flash without first being stored in SDRAM.

If a condition develops where SDRAM becomes maxed out and can no longer take in data, then measured buffering will be implemented according to a threshold trigger. An instruction set and algorithm in FW 110 enables FPGA 202 to only take in data from the host at a speed less than or equal to that of data being moved into Flash from SDRAM to make room for the new data. To accomplish this, the data being written to SDRAM may be throttled by slowing the speed at which acknowledgements are issued for write requests. At the speed that data is written and moved from SDRAM to Flash, the host system may notice no appreciable degradation in performance.

In another embodiment, the measured buffering algorithm works according to weight of data whereby data is only moved from buffer utility 305 to buffer utility 303 when the same or more weight of data has been dumped into Flash from SDRAM. A combination of the two techniques may also be employed without departing from the spirit and scope of the present invention. In this way a condition where the host must be interrupted from writing data is completely avoided.

Figure 4:
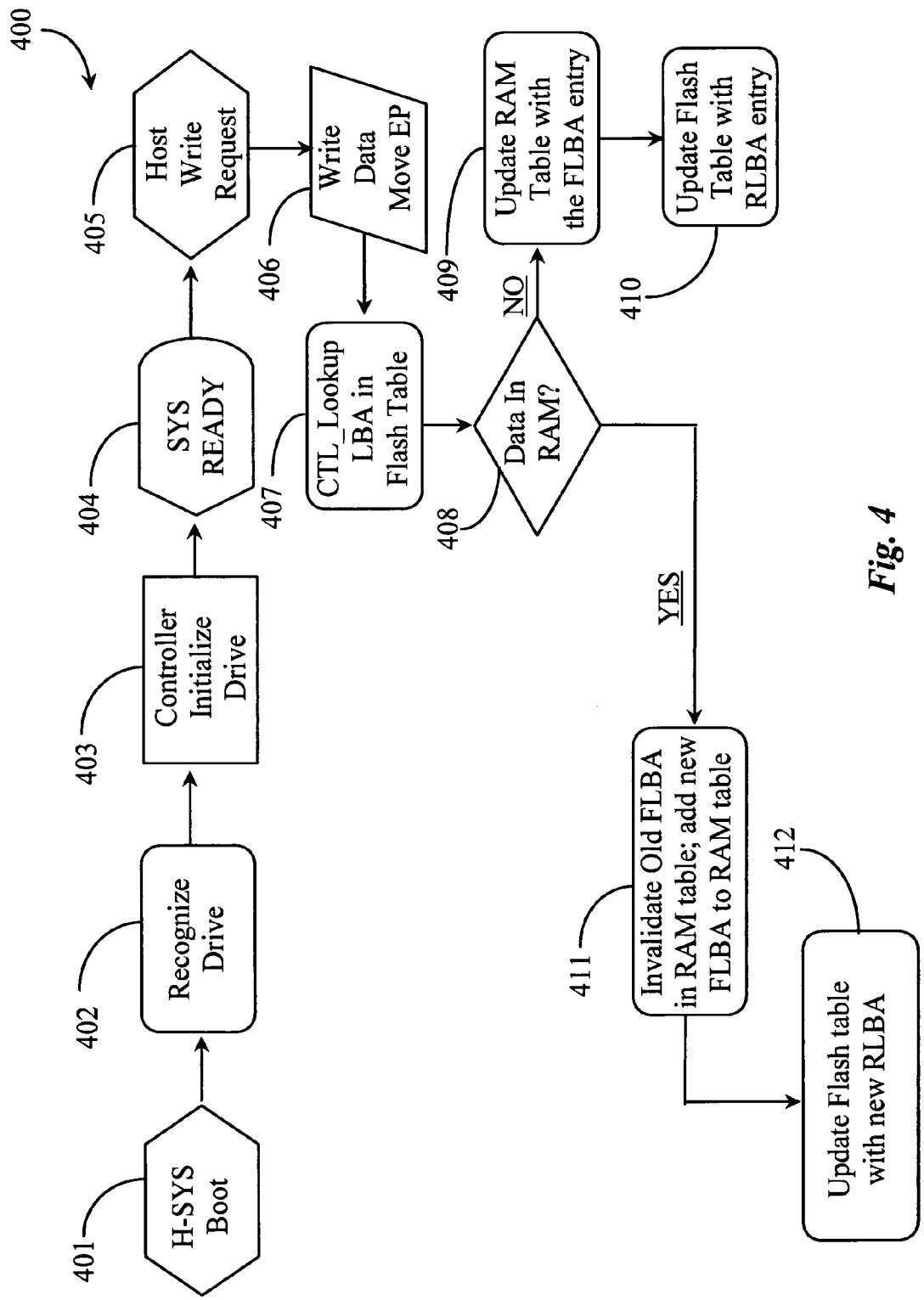
FIG. 4 is a flow chart illustrating acts for managing writes to a combination RAM and Flash disk according to an embodiment of the present invention.

FIG. 4 is a flow chart 400 illustrating acts for managing writes to a hybrid RAM and Flash disk according to an embodiment of the present invention. The first 4 acts of chart 400 are assumed repeated at every power on event. At act 401, the host system boots and at act 402 the system recognizes the solid-state hybrid disk of the invention. Act 402 assumes that the disk, analogous to disk 100 described in FIG. 1 is a primary storage device. The host system recognizes a single drive of a non-volatile type, in one example, a SCSI disk drive.

At act 403, the controller 300 initializes the drive. It will be appreciated that in one example RAM may be SDRAM as described further above. At act 404, the host system reports that the system is ready. Act 403 may also include loading the Flash LBA table into reserved RAM.

At act 405, a host issues a write request. This event may be the first write request made after boot, or it may be a request made sometime after data has already been written to RAM during the current computing session. At act 406, the host system or controller receives a write address. The address received is to the RLBA pointed to by the RAM (EP) described further above. If no data has yet been written to RAM prior to act 405, then the RAM (EP) may be one LBA ahead of the RAM (SP) or they may initially point to the same LBA. In this act, the data may be written to RAM and the RAM EP may be incremented to the next LBA. Writing to an LBA in RAM does not depend on any result from consulting the FLBA table.

At act 407, an onboard controller analogous to controller 104 described with respect to FIG. 1 performs a LBA lookup in the Flash table to determine if there is data in RAM for that address at act 408. In any case, at act 406 the data has been written to RAM. At act 408 a determination of how to update the RAM and Flash tables is made according to the read state as described above for act 407. For example, if at act 407 the controller reads a corresponding RAM LBA instead of a 0 then the RAM LBA where the data currently resides would be referenced in the Flash LBA table at act 412. The controller simultaneously accesses the RAM table in act 411 and invalidates the old RLBA by setting it to 0, adds the new RLBA designation to the Flash table where the data has just been written for that Flash LBA. If at act 407 the controller read a 0 in the FLBA entry, then at act 408 it is determined that there is no data in RAM for that FLBA. At act 406 the data has already been written to RAM as described above. At act 409 then, the controller updates the RAM table with the FLBA entry where the data just written will go into Flash if it is eventually moved into Flash. At act 410, the controller updates the Flash table with the RLBA designation where the data has just been written. In this example, for a RAM table a 0 is used to indicate that there is no RAM data at that address, a value indicates that there is data stored at that address. For the Flash table, there is either a 0 indicating that there is no RAM data being stored for that address, or the RBLA showing that there is data for that address in RAM and where the data is.

It is important to note herein that the process described by acts 405 through 412 may not occur in any specific sequential manner. For example, writing to RAM may occur simultaneously with table updating. It will also be appreciated that there may be additional sub acts performed that are not specifically illustrated in this example such as an act for acknowledging a write request between acts 405 and 406. In the event that act 405 is a first write request, for example, there would be no RAM data already being stored for Flash. Acts 405 through 408 occur every time the host writes to the disk of the present invention. Acts 409 and 410; or acts 411 and 412 occur according to read state of the Flash table upon lookup in act 407. At 406, the RAM (EP) is always incremented to the next RLBA after each write. The distance between the RAM (SP) and RAM (EP) grows accordingly.

Figure 5:
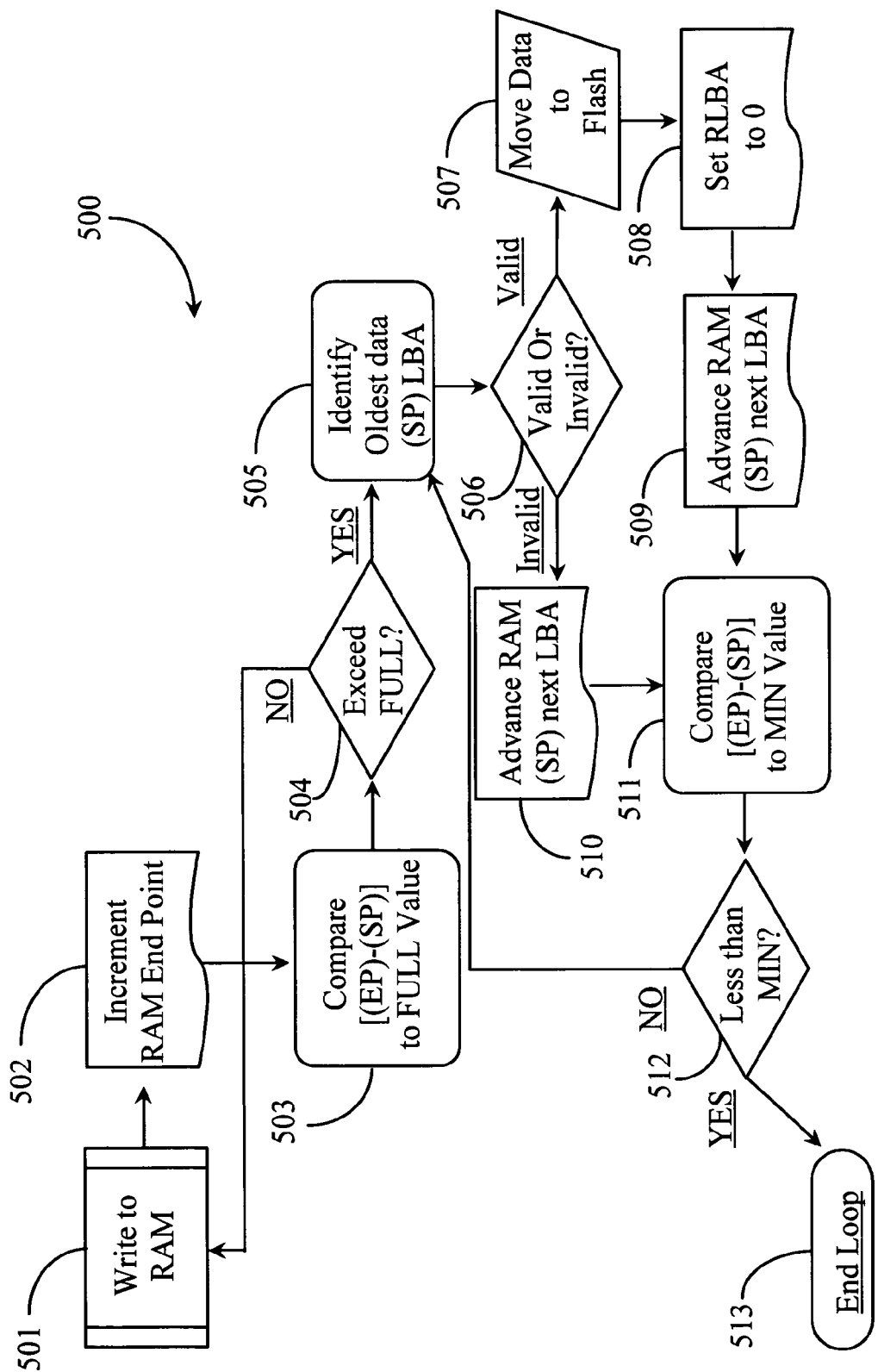
FIG. 5 is a flow chart illustrating acts for managing data in RAM according to an embodiment of the present invention.

FIG. 5 is a flow chart 500 illustrating acts for managing data in RAM according to an embodiment of the present invention. The inventor provides a method for regulating the amount of RAM that is allowed to hold data by using threshold values to trigger when data is moved from RAM to Flash. It is important that RAM is not allowed to exceed a reasonable state of full while it is also important that Flash isolation from writes is maintained satisfactorily.

Chart 500 assumes a write to RAM has just been executed in act 501. It is also assumes that the appropriate tables have been updated accordingly. At act 502 then, the controller increments the RAM (EP) to the next RLBA. At this point in chart 500, the controller using an algorithm and a preset value in act 503 determines the current volume of RAM containing valid data. More specifically, a comparison is made of the difference in the RAM (EP) position and the RAM (SP) position is determined by number of LBAs and then compared against a pre-determined value of "Full". The threshold defines the point at which the system is no longer comfortable filling RAM with data without freeing up more RAM space.

At act 504 a determination is made whether current data in RAM exceeds the full mark. If not, then the process loops back to act 501 and no further action is required. However, if at act 504 the controller determines that the full value has been exceeded, then at act 505, the controller accesses the RAM table to identify the oldest data being stored in RAM. The RAM (SP) in the table identifies the oldest data. The next oldest data is identified by the next sequential LBA in the range and so on.

Before moving the oldest data out of RAM and into Flash, a determination may be made as to whether the data referenced by that RLBA is valid or invalid at act 506. If the data is valid and has not been overwritten then it may be moved out of RAM and into Flash. Therefore, at act 506, if the data in RAM for that RLBA is valid data then at act 507 that oldest data is moved to Flash at the FLBA location referenced for that address. At act 508 the controller sets the RLBA entry to 0 and at act 509, the RAM (SP) is incremented to the next RLBA in the table.

If at act 506 the referenced data is invalid then nothing is done and at act 510 the RAM (SP) is advanced to the next RLBA. The process may culminate at act 511 for both conditions after advancing the RAM (SP) whether or not any data has been moved out of RAM and into Flash. Obviously the difference in volume between the RAM_FUL value and the RAM_MIN value is a known variable. A predictive algorithm that relies on performance statistics may, in one embodiment, be provided in FW to determine approximately when to check the current volume against the target minimum value. In a preferred embodiment, the state machine that monitors the RAM volumes is constantly running asynchronously with many other processes.

At act 511, the controller compares the difference between RAM (EP) and RAM (SP) to a predetermined minimum RAM value. This value defines a volume of data being stored in RAM that indicates a comfortable level of data in RAM the system. At act 512 the result of the comparison is determined. If at act 512 the volume is not less than the minimum target volume, then the process loops back to act 505 and continues until the minimum volume has been achieved. It is noted herein that data is not necessarily written to Flash at every indication of validity. The inventor provides yet another unique optimization that may run concurrently with this process, the optimization enabling further isolation of Flash memory from writes. The just-mentioned optimization will be detailed later in this specification.

If at act 512, the volume result from act 511 is less than the target minimum, then at act 513 the loop drops off until the result of (EP)-(SP) again exceeds the predetermined full value at act 504. The RAM (EP) is incremented every time data is written into RAM. The RAM (SP) may be incremented only when required as a result of exceeding a predetermined RAM full threshold. In this case, data may be moved out of RAM and into Flash or not depending on validity. It is desired that data in RAM stays in RAM until the host system shuts down or until power is inadvertently interrupted at which time all of the valid data in RAM is moved toward Flash. Considering practical application of the present invention, complete Flash isolation from writes except for power down or interruption may not be entirely achieved, one goal however is to minimize the number of writes into Flash as much as is possible for any given system configuration.

Figure 6:
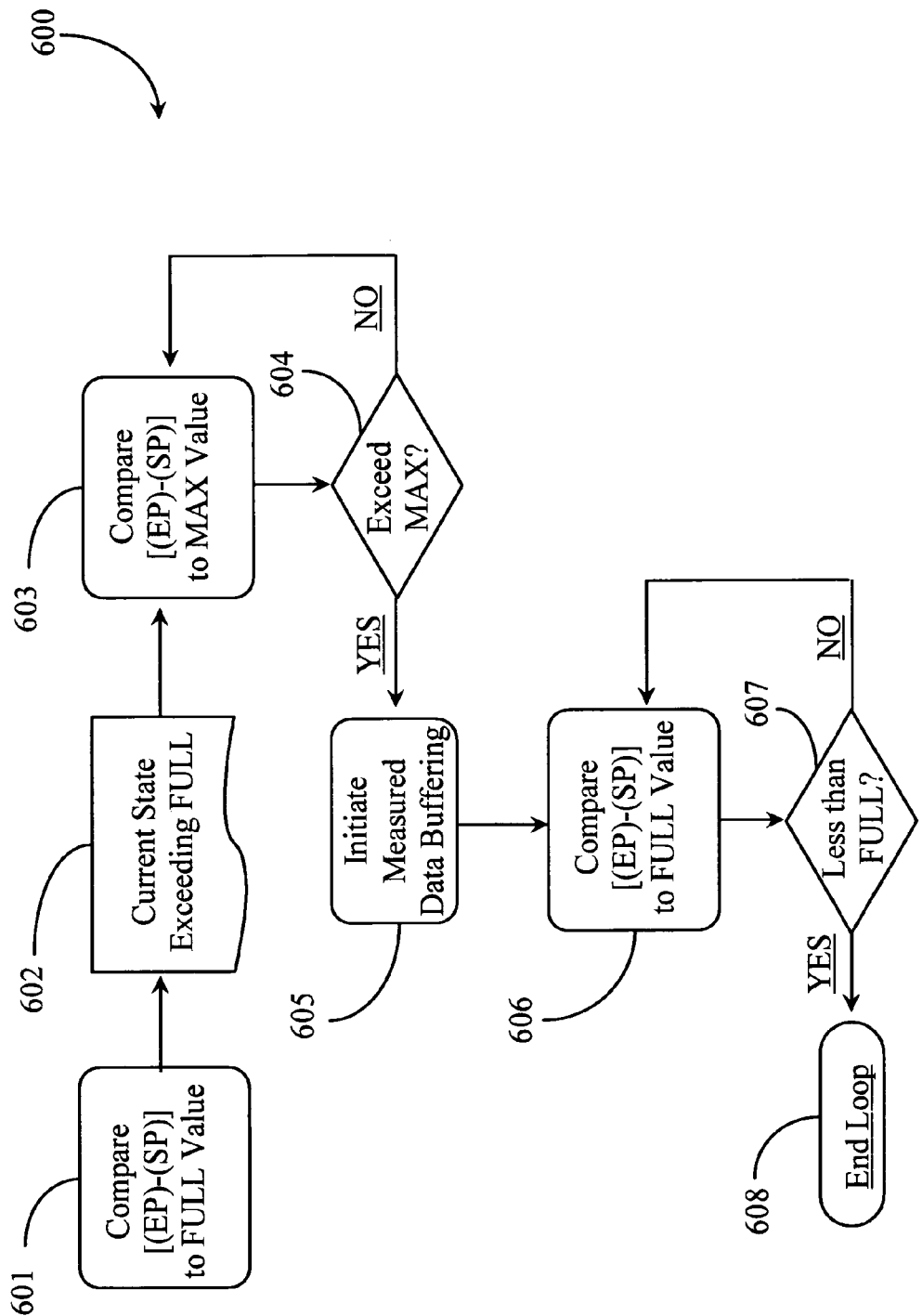
FIG. 6 is a flow chart illustrating acts for protecting against RAM data overflow according to an embodiment of the present invention.

FIG. 6 is a flow chart 600 illustrating acts for protecting against RAM data overflow according to an embodiment of the present invention. The inventor provides a method for protecting the RAM volume from a volume-overrun state. In this process it is assumed that a comparison has occurred comparing the difference between the RAM (EP) and the RAM (SP) in act 601, and that the resulting state displayed at act 602 is that the current volume is exceeding the acceptable full value. The controller at act 603 calculates and compares the difference between the current RAM (EP) and the current RAM (SP) (already determined to be exceeding the Full value) to a predetermined maximum (MAX) value. Beyond the MAX value, RAM may no longer be able to accept any data writes without some optimization to RAM memory management. At act 604, the controller makes a determination whether the result of act 603 exceeds MAX value for RAM or not. If the value has not been exceeded, the process loops back to act 603. If the determination is yes at act 604 the controller orders measured data buffering at act 605. Measured data buffering is accomplished by requiring new data coming to be throttled by increasing the time period for sending acknowledgements to the system host after each received write request. This implementation may vary somewhat on the exact protocol used for the handshake. For example IDE protocol may differ somewhat than SCSI protocol. However, all protocols call for some form of acknowledgement to the host before a data write can happen. By doing this, the system ensures that aged data is being moved out of RAM or aged out of validity at a rate faster than new data coming in is accepted. In actual practice the RAM speed is much faster that the speed at which writes.

At act 606, the controller compares the value (EP)-(SP) to the predetermined RAM full value. At act 607, the controller determines if the resulting value is less that the full value. If it is not, the process loops back to act 606 repeatedly as measured data buffering continues and data is moved from RAM to Flash and/or otherwise invalidated until the controller determines that the result of (EP)-(SP) IS less than full. When this occurs the loop ends at act 608 and measured data buffering is discontinued. However normal emptying of RAM cache will still continue as previously described with respect to the flow chart of FIG. 5 until the minimum RAM volume is achieved. In one embodiment, the RAM table has a pointer that is incremented in synchronous fashion with the RAM (SP) indicating a RAM MAX point. In this case, when the RAM (EP) catches up to the RAM (MP), measured data buffering kicks in until a comfortable buffer margin is again established, at which time measured data buffering may be switched off.

It will be apparent to one with skill in the art that in the event of a physical RAM (MP) that is synchronously incremented with the RAM (SP), there may not be a requirement for a predetermined RAM MAX value stored in the FPGA. One with skill in the art will appreciate that the process of chart 600 may run concurrently with the other processes described in this specification. FW contains software machines that run independently and utilize independent processing threads. Therefore it is conceivable that all processes are constantly running in the background as data processing ensues.

Figure 7:
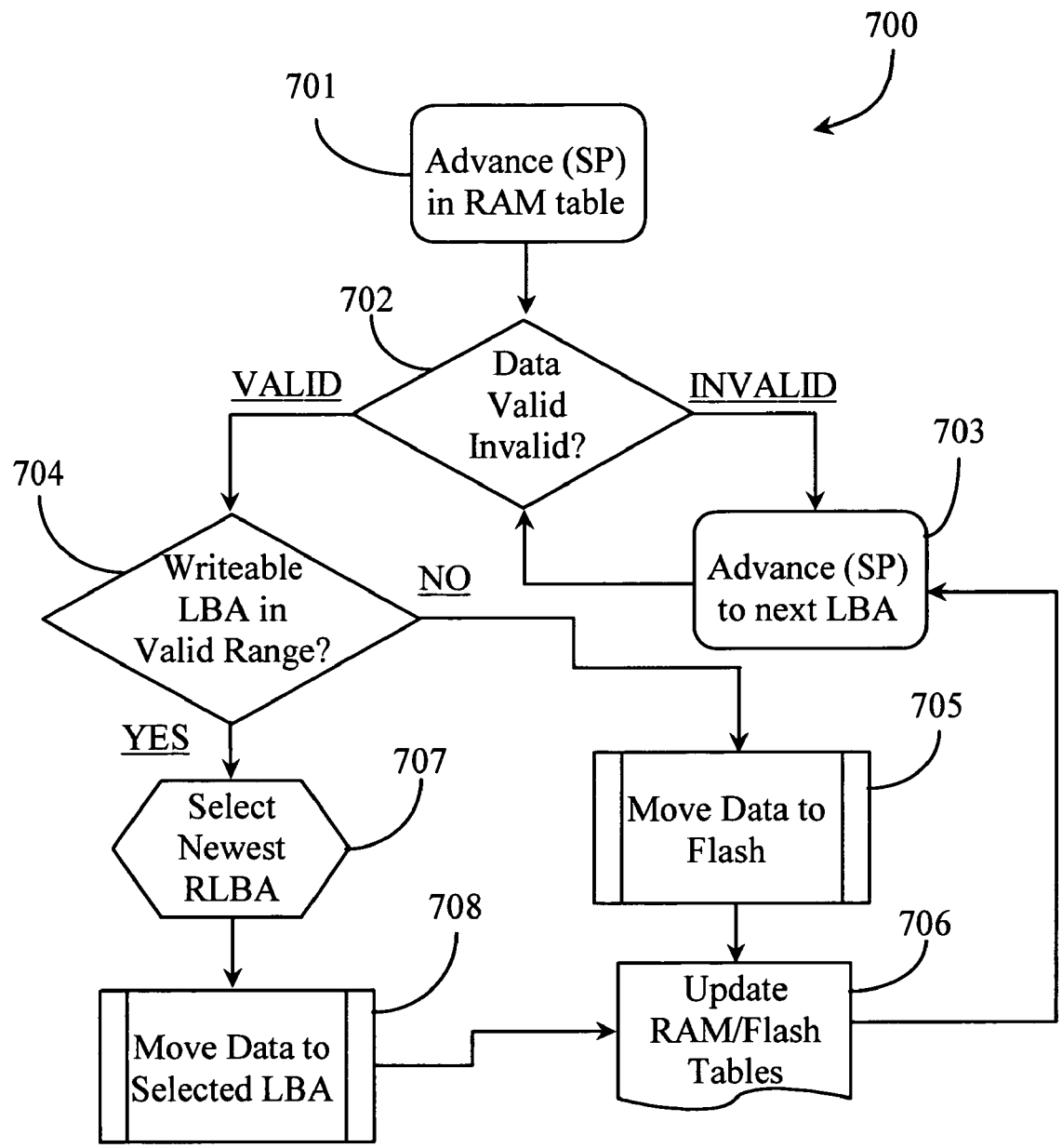
FIG. 7 is a flow chart illustrating acts for optimizing RAM space according to an embodiment of the present invention.

FIG. 7 is a flow chart 700 illustrating acts for optimizing RAM space according to an embodiment of the present invention. The inventor provides a unique method for compacting RAM memory to further isolate Flash memory from writes. This exemplary process assumes that in act 701 the RAM (SP) has just been advanced to a next LBA. Advancement of the RAM (SP) generally occurs when the RAM full value has been exceeded and may continue until the RAM minimum value is again established.

In act 702, the controller determines if the data in RAM for that LBA is valid or invalid. If the data is invalid, meaning it is overwritten somewhere else in RAM, the bit flag will show 0 to indicate that state. In this case, the data is not valid so no further action is required and at step 703 the controller advances the RAM (SP) to the next LBA and the process loops back to act 702 to determine if the data at that LBA is valid or invalid.

At act 702, if it is determined that the data for that LBA is valid, meaning it has not been overwritten anywhere else in RAM. At act 704, the controller may perform a lookup to determine if there are any available LBA locations ahead in the valid range of RAM where the current valid data may be moved to avoid writing that data to Flash memory at that particular time. An available LBA is one that has invalid data evidenced by a 0 bit flag. Such an LBA location may be overwritten with the valid data.

It is noted herein that for many GBs of RAM, there may be many LBAs to lookup ahead of the current RAM (SP). Therefore, the valid range of RAM between the RAM (SP) and the RAM (EP) may be divided into logical portions where one portion is searched at a time. In one embodiment, the oldest portion, or the portion holding the oldest written data is first searched. Therefore act 704 may include more than one round of table lookup.

If at act 704, it is determined that there are no LBAs that may be written to in the range, and the data has not been overwritten during the time of evaluation, then at act 705, the valid data is moved into Flash Memory at the referenced FLBA in the table, or block of LBAs. In this case, at act 706 the RAM and Flash tables are appropriately updated and the process loops back to act 703 where the RAM (SP) is advanced to the next LBA.

If at act 704, the controller determines that there is one or more LBAs found that can be overwritten with the valid data, then at act 707 the LBA referencing the oldest invalid data may be selected as the location to move the current valid data to. At act 708, the controller moves the data to the new location in RAM. In this case, a write to Flash is avoided and the valid data is given a maximum aging cycle in hopes that it will be overwritten by the time the RAM (SP) advances to the new LBA referencing the moved data. At act 706, the controller updates the RAM and Flash tables accordingly and the controller advances the RAM (SP) to the nest LBA.

It will be apparent to one with skill in the art that use of multiple independent processing threads enable the optimization described by the acts of this example to run concurrently with other processes defined above without departing from the spirit and scope of the present invention. It will also be apparent to one with skill in the art that read and write operations may be performed on LBA clusters or blocks containing multiple LBAs worth of data. Likewise, the RAM (EP) and (SP) may be incremented by cluster instead of single LBA.

Figure 8:
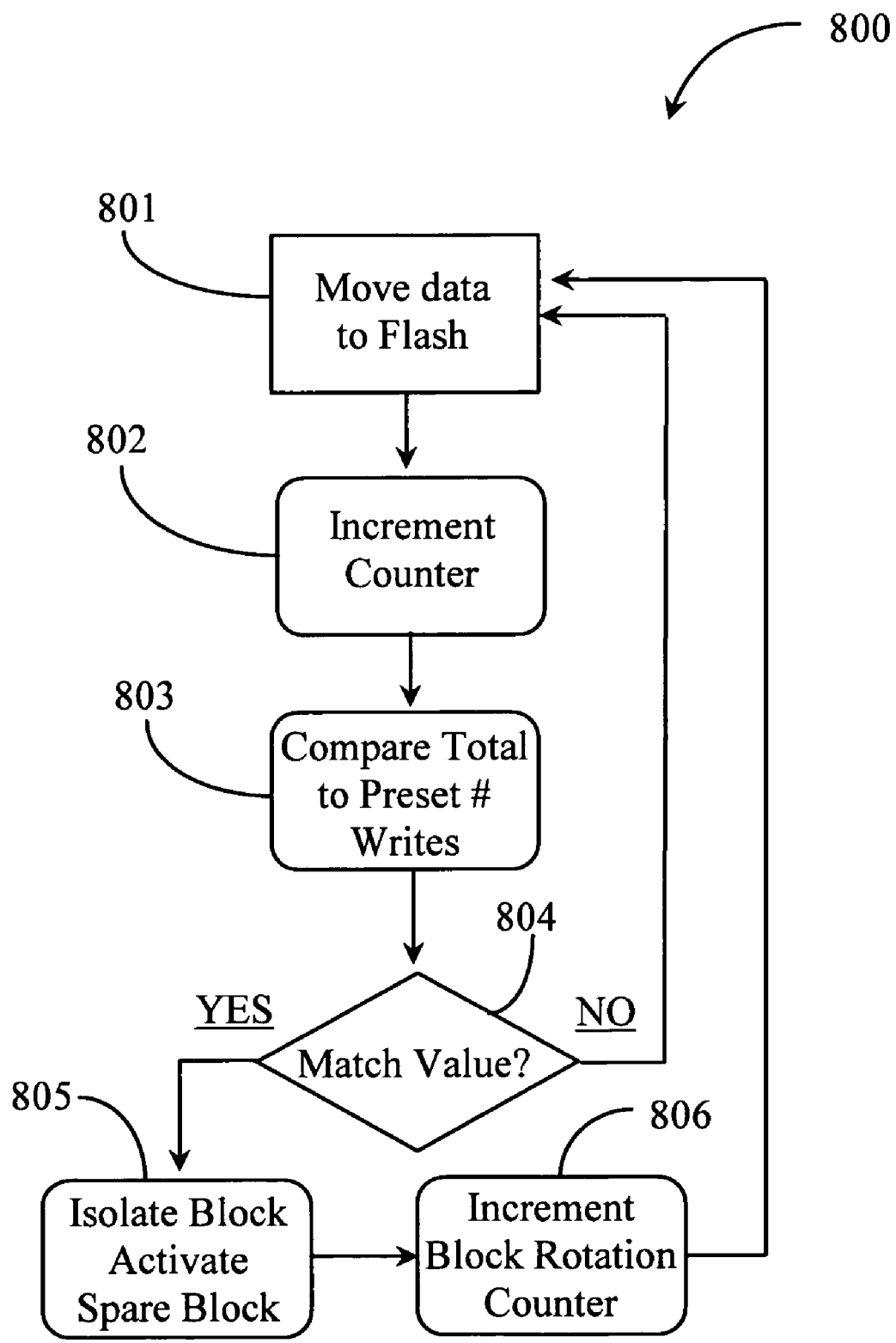
FIG. 8 is a flow chart illustrating acts for write balancing Flash memory according to an embodiment of the present invention.

FIG. 8 is a flow chart 800 illustrating acts for write balancing Flash memory according to an embodiment of the present invention. The inventor provides a method for balancing the data writes to Flash over the total number of Flash blocks provided with the solid state hybrid disk of the present invention. It is known in the art that individual Flash chips have a Flash cell rotation scheme that attempts to wear level that chip by reserving a spare unit on the chip and rotating the spare unit assignment over all of the units on that chip. However, the present invention employs a multiple number of Flash chips connected in parallel for data storage according to specific use aspects of the invention. Therefore, what is needed is an additional write balancing method for balancing data writes over the total Flash units available on the drive of the present invention such that all of the units on each of the separate chips enjoy selectable rotation in and out of service using a sequential rotating assignment based on a total number of writes to the total Flash space.

This process assumes that data has just been written to Flash in act 801. At act 802, a counter provided in the FPGA and adapted for the purpose of keeping track of the total number of write operations made to Flash memory is incremented to account for the write operation of act 801.

At act 803, the controller compares the total number of write operations made as evidenced by the counter to the pre-set threshold value of total number of writes to Flash space. At act 804, the controller determines if the counter value matches the threshold value. If not then the process loops back to the next write operation in act 801. If there is no data write to flash associated with the advancement of the RAM (SP), then the counter is not incremented.

If at act 804, the counter value matches the preset threshold value, then at act 805 an active Flash unit or block is rotated out of service for accepting reads or writes and a previously assigned spare Flash block is activated for reading and writing. Also in this step, the flash write counter is zeroed out or erased. At act 806 any data in the block rotated out of service is moved to the block just put into service and a total block rotation counter is incremented. The process then loops back to act 801 and runs continuously through all of the acts described. The counter for keeping track of the number of spare block rotations that have occurred from the time the device was first put into use may be stored in the non-volatile memory or a reserved portion of non-volatile memory provided locally on the controller. At power up and after the drive has had data stored on it and when the device is sub sequentially powered down, the block that is currently rotated out of service must be identified. All access to the non-volatile storage then is indexed to the number of rotations that have occurred. In this way, the entire memory space (each LBA) is eventually rotated through all of the possible LBA addresses. In one embodiment there may also be more than one spare block initially assigned as a spare in non-volatile memory. At each power up event of the device, the LBA addressing is indexed off of the current block rotation value. A separate block rotation counter is not specifically required in order to successfully practice the present invention. In one embodiment, the total block rotation number is 0 until the first time the preset threshold of total number of writes is reached. Thereafter, the value is added to incrementally each subsequent time the total number of writes threshold is reached accounting for the latest number of block rotations.

Figure 9:
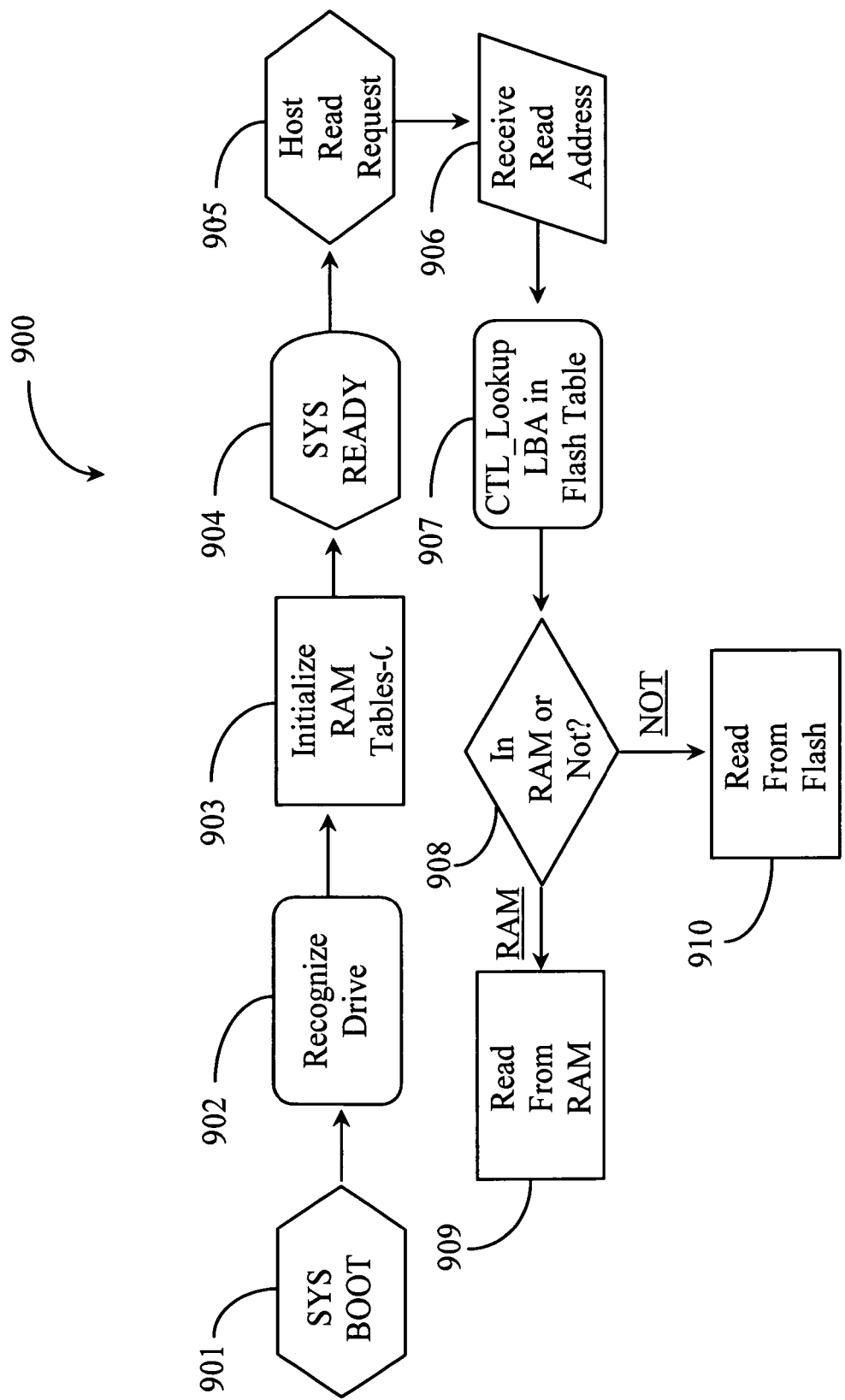
FIG. 9 is a process flow chart illustrating acts for reading data from a solid-state non-volatile disk according to an embodiment of the present invention.

FIG. 9 is a process flow chart 900 illustrating acts for reading data from a solid-state non-volatile disk according to an embodiment of the present invention. It is noted herein that while reads do not have any impact of MTBF of a Flash memory, the process of reading from the solid-state disk of the present invention is unique over read operations performed on prior-art devices.

This process assumes a system boot in act 901; drive recognition in act 902; initialized RAM tables in act 903; and a system ready at act 904 before read or write operations may commence. In the boot sequence, Flash and RAM memories may also be checked for bad blocks or units. If any are found, they may be flagged out of service.

At act 905, the host issues a read request. At act 906, the controller receives the read request and acknowledges same. At act 907, the controller performs a table lookup for the FLBA subject to the read request. At act 908, the controller determines if the data requested to be read is in RAM or not. If not, then at act 910 the data is read from Flash memory. If at act 908, it is determined that the data for that address is in RAM, then at act 909 the data is read from RAM.

Figure 10:
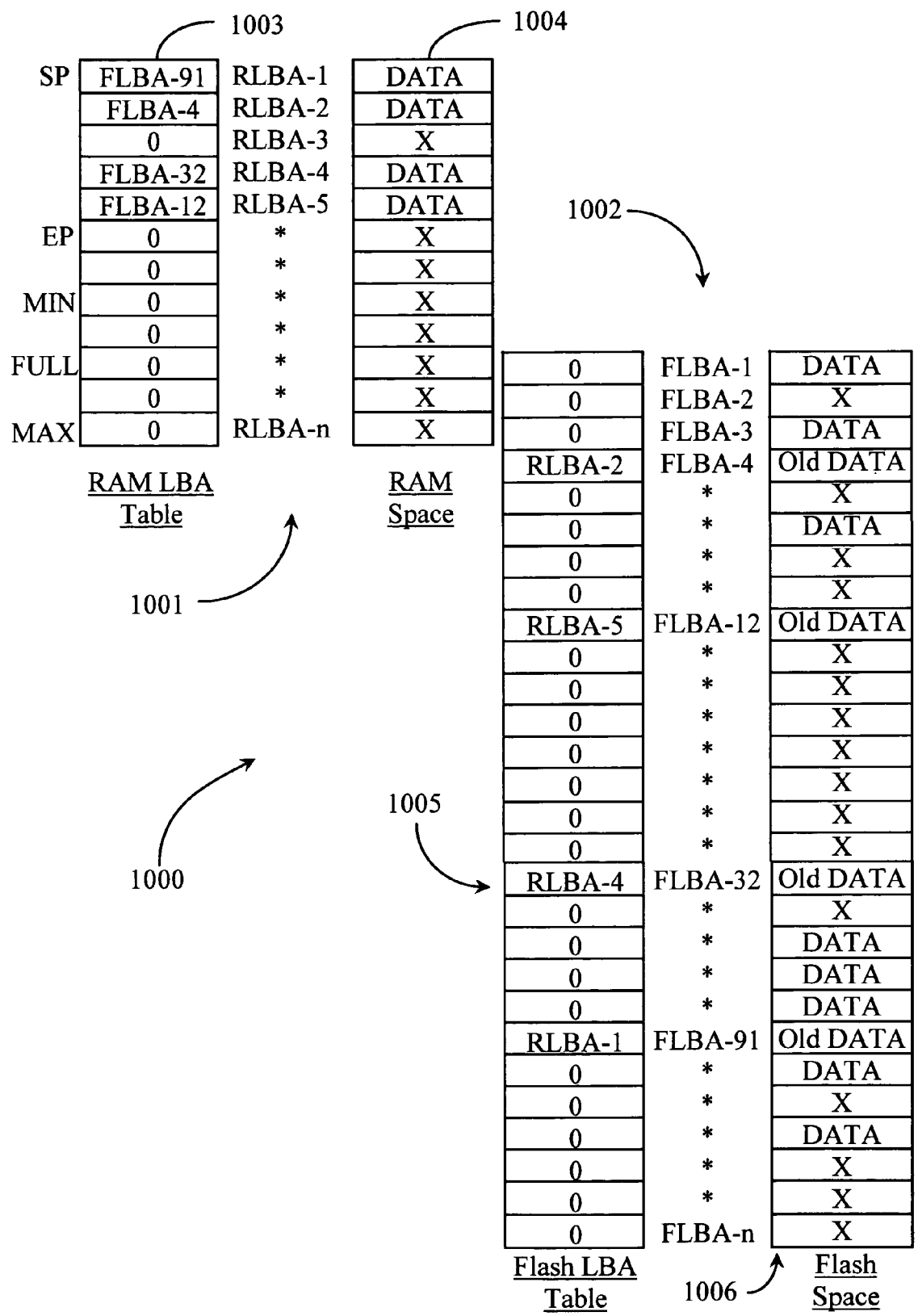
FIG. 10 is a logical memory map 1000 illustrating mapping of memory space for RAM and Flash according to an embodiment of the present invention.

FIG. 10 is a logical memory map 1000 illustrating mapping of memory space for RAM and Flash according to an embodiment of the present invention. The inventor intends that the following embodiment is exemplary of just one possible method for mapping memory space between the volatile and non-volatile memories provided in the drive system of the invention. It is noted herein that the controller described further above manages the memory spaces and correspondence mapping and the tables that illustrate current data states of those memories.

Map 1000 includes a RAM LBA table and corresponding RAM Space represented as a logical or corresponding pair 1001. Pair 1001 includes a RAM LBA table 1003 and a logical representation of RAM Space 1004. Table 1003 may be assumed divided so that each logical block holds one LBA of data. Each division of RAM space is labeled with an RLBA number beginning at RLBA-1 and ending at RLBA-n to show that any number of LBAs may be accounted for. Table 1003 shows valid data in RAM space 1004 for the first (RLBA-1) and second (RLBA-2) blocks and for the fourth (RLBA-4) and fifth (RLBA-5) blocks. A 0 entry in table 1003 for RLBA-3 indicates invalid data. Corresponding RAM space 1004 indicates data currently held in the just described blocks. Table 1003 indicates the FLBA addresses in Flash where the data (DATA) in the RAM space will eventually be written to in Flash. Table 1003 illustrates a RAM start point (SP), a RAM endpoint (EP). In this particular example, the MIN point, Full point, and MAX point are also logically represented.

Map 1000 includes a logical pair 1002 consisting of a Flash LBA table 1005 and a corresponding logical representation of Flash Space 1006. Flash table 1005 has 0s and RLBA address entries. It may be assumed that each block in the Flash table holds one LBA of data as is evidenced by FLBA-1 through FLBA-n. The 0s indicate no data in RAM that will be written to those Flash blocks while those blocks indicating a RLBA address show that there is data being held in RAM that may eventually be written into Flash at the corresponding Flash blocks. It can be seen in table 1005 that data held in RAM space at RLBA-2 is held for the fourth Flash block and so on.

In the representative Flash space 1006, The Flash blocks contain both current data and old data. For example, the first block contains current data with no data in RAM held to replace it. The fourth block contains old data that may be overwritten by data being held in Ram space at RLBA-2. Looking now at the RAM LBA table 1003, it may be seen that RLBA-2, or block 2 has an entry of FLBA-4 indicating the Flash LBA where that cached data may eventually be written to. In this way, the FLBA table may be accessed sequentially without searching the table and efficient memory management is enabled by one to one correlation using minimum processing.

The solid-state hybrid disk drive of the present invention may be adapted for any type of operating system and a wide variety of computing devices. For example, in one embodiment the disk and onboard controller is adapted for use as primary non-volatile storage for one or more enterprise servers. A version of the solid-state hybrid disk may be adapted as primary storage for desktop or laptop computing devices. Still other versions may be provided for handheld computing systems running lightweight operating systems. These may include hand-held computers, cellular telephones and digital music players without departing from the spirit and scope of the present invention. There are many possibilities.

In another embodiment of the present invention, the solid-state disk drive of the present invention may be adapted as secondary storage for enterprise servers or one or more computing workstations. The disk drive of the invention may be included with other disks in array such as a raid array or other known multiple disk backup system. In still another embodiment, multiple terminals may share the solid-state disk of the present invention as a single primary storage. With slight modifications there are many possibilities.

What is claimed is:

1. A method for managing reads and writes in a solid-state drive having a volatile memory portion and a non-volatile memory portion, comprising the steps of:
   (a) upon receiving a write request including an address and data, determining if the address is referenced at a first location in the volatile memory portion, and if so, overwriting any data at the first location, and if not, writing the data to a second location marked as available for writing in the volatile portion, and associating that location with the address;
   (b) upon receiving a read request including an address, determining if the address is referenced at a location in the volatile portion, and if so, reading data from that location, and if not, reading data from the address in the non-volatile portion; and
   (c) periodically comparing valid data volume in the volatile memory portion with a preset threshold, and upon exceeding the threshold, selecting data that has been longest in the volatile memory portion without alteration, moving that data from the volatile to the non-volatile portion, and marking the locations from which the data is moved as available for writing in the volatile portion.

2. The method of claim 1 wherein in step (a), the address is a logical block address (LBA) tabled in a Flash LBA table held in a reserved portion of the volatile memory.

3. The method of claim 2 wherein in step (b), the determination is made by looking for a reference to a LBA in volatile memory in the Flash LBA table at the assigned LBA entry in the table.

4. The method of claim 3 wherein in step (b), the LBA is determined by a pointer pointing to the LBA of data in a RAM LBA table held in a reserved portion of the volatile memory and the volatile memory is RAM or a variation thereof.

5. The method of claim 3 wherein in step (b), if previous data was found in memory for the assigned Flash LBA, then the RAM LBA entry in the Ram LBA table associated to the previous data written is updated to invalidate the previous data.

6. The method of claim 1 wherein the non-volatile memory is one of a NAND Flash memory or another type of non-volatile storage.

7. The method of claim 1 wherein in step (c), the data is held in the volatile memory until one or more trigger events cause the data to be moved into the non-volatile memory.

8. The method of claim 1, further including step (d) for repeating step (c) according to the conditions until a predetermined minimum threshold value of data in volatile memory is realized.

* * * * *